United States Patent
Inoue et al.

(10) Patent No.: US 6,638,661 B2
(45) Date of Patent: Oct. 28, 2003

(54) BATTERY AND PRODUCING METHOD THEREOF

(75) Inventors: Takefumi Inoue, Kyoto (JP); Kazumasa Matsuo, Kyoto (JP); Hiroaki Yoshida, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/397,965

(22) Filed: Sep. 17, 1999

(65) Prior Publication Data

US 2003/0157404 A1 Aug. 21, 2003

(30) Foreign Application Priority Data

Sep. 17, 1998 (JP) .......................... 10-263293

(51) Int. Cl.[7] .......................... H01M 2/00; H01M 2/02; H01M 2/04
(52) U.S. Cl. .................. 429/163; 429/175; 429/176; 29/623.1; 29/623.2
(58) Field of Search .................. 429/163, 164, 429/168, 175, 176, 94; 29/623.1, 623.2; 219/121.64

(56) References Cited

U.S. PATENT DOCUMENTS

| | | | | |
|---|---|---|---|---|
| 3,600,232 A | * | 8/1971 | Daguenet | |
| 5,827,621 A | * | 10/1998 | Morishita et al. | 429/176 |
| 5,879,416 A | * | 3/1999 | Nakamura et al. | 29/623.2 |
| 5,885,732 A | * | 3/1999 | Verhoog | 429/176 |
| 6,001,504 A | * | 12/1999 | Batson et al. | 429/163 |
| 6,004,692 A | * | 12/1999 | Muffoletto et al. | 429/163 |
| 6,127,064 A | * | 10/2000 | Shibata et al. | 429/163 |
| 6,174,620 B1 | * | 1/2001 | Okada et al. | 429/176 |
| 6,258,480 B1 | * | 7/2001 | Moriwaki et al. | 429/176 |

FOREIGN PATENT DOCUMENTS

| | | | |
|---|---|---|---|
| EP | 1037290 A1 | * | 9/2000 |
| JP | 06-068861 | | 3/1994 |
| JP | 08-077983 | | 3/1996 |
| JP | 10-241651 | | 9/1998 |
| JP | 11-025935 | | 1/1999 |
| JP | 11-047920 | | 2/1999 |
| JP | 11-067161 | | 3/1999 |
| JP | 11-077347 | | 3/1999 |
| WO | WO 99/25035 | * | 5/1999 |

OTHER PUBLICATIONS

Linden. Handbook of Batteries, 2nd ed., pp. 29.6–29.7; 33.4–36.6. 1995 (no month).*

Berndt, Maintenance–Free Batteries, pp. 237–238. 1993 (no month).*

* cited by examiner

*Primary Examiner*—Patrick Ryan
*Assistant Examiner*—Tracy Dove
(74) *Attorney, Agent, or Firm*—Sughrue Mion, PLLC

(57) ABSTRACT

A battery has a battery case body made of aluminum or aluminum alloy, and a battery cover fitted into the battery case body made of aluminum or aluminum alloy. The battery case body and said battery cover have bonding areas, respectively, which are connected by laser welding. In the battery, the thickness of each of bonding areas of a battery case body and a battery cover is smaller than that of the remaining areas.

9 Claims, 8 Drawing Sheets

BATTERY AND PRODUCING METHOD THEREOF

BACKGROUND OF THE INVENTION

1. Field of the Invention

The present invention relates to a battery provided with a battery case of aluminum alloy, for example, in which a battery case body and a battery body are fitted to each other and are connected by laser welding.

2. Description of the Related Art

A large scale non-aqueous electrolytic secondary battery, which is used for an application of large capacity, has used a battery case of stainless steel. However, in recent years, in order to reduce the weight, the battery case of aluminum alloy has been used in many cases. The non-aqueous electrolytic secondary battery provided with a battery case of aluminum alloy is constructed as follows. Within a battery case body 1 in a shape of a long cylindrical vessel of aluminum alloy as shown in FIG. 10, a power generating element (not shown) and positive and negative terminals 3, 4 connected to the electrodes thereof are housed. In this state, an oval battery cover 2 of aluminum alloy is fit in an upper end opening of the battery case body 1 and its periphery is sealed by welding as shown in FIG. 11. In this case, the peripheral edge of the oval battery cover 2 is bent upwards to constitute a bonding area 2a which is fit along a bonding area 1a of the upper end opening of the battery case body 1. As shown in FIG. 13, the respective bonding areas 1a and 2a of the battery case body 1 and battery cover 2 are connected by welding, thereby completing a battery case. In the case of the battery case of stainless steel, TIG welding is used, whereas in the case of the battery case of aluminum alloy, laser welding is used.

Incidentally, as shown in FIG. 10, the battery cover 2 has terminal holes 2b and 2c through which positive and negative terminals 3 and 4 protrude and an injection hole 2d for injecting an electrolytic solution into the battery case. It should be noted that these holes are made previously. Further, as shown in FIG. 11, after the battery cover 2 is welded, the terminal holes 2b and 2c are closed by screwing nuts to the positive and negative terminals 3 and 4 from the battery cover 2. The injection hole 2d is closed by a setscrew, for example, after the electrolytic solution is injected.

Meanwhile, the laser welding is performed in such a manner that a body is irradiated with laser light so that the body absorbs the energy of the laser light and hence is heated and molten. In this case, before being molten, the aluminum alloy used for the battery case body 1 and battery cover 2 decreases the absorption rate since it reflects almost the entirety of the laser light, whereas after being molten it increases the absorption rate. Therefore, lower laser power cannot easily melt the aluminum alloy. However, increased laser power abruptly heats the aluminum alloy after being molten. As a result, the aluminum alloy thus molten is scattered so that pinholes or cracks may be generated in the bonding areas 1a and 2a.

Thus, it is difficult to adjust the laser power when the battery case of aluminum alloy is laser-welded. If the laser power is increased, there was a problem that the pin-holes and cracks may be generated in the bonding areas 1a and 2a between the battery case body 1 and battery cover 2.

SUMMARY OF THE INVENTION

It is an object to provide a battery in which a battery case can be easily laser-welded with low laser power. According to a first aspect, the present invention provides a battery provided with a battery case in which with a battery cover of aluminum or aluminum alloy fit into a battery case body of aluminum or aluminum alloy, their bonding areas are connected by laser welding. In the battery, the bonding areas of the battery case body and battery cover are mated with each other and the thickness of their bonding areas is made smaller than that of the remaining areas of the battery case body and battery cover.

Aluminum or aluminum alloy has a very high thermal conductivity. Therefore, if the bonding areas of the battery case body and battery cover has a large thickness, when energy is absorbed from irradiated laser light, heat diffuses soon into the environment. As a result, the heat cannot be concentrated into the irradiated portion. However, in accordance with the first aspect of the present invention, the thickness of each of the bonding areas is small so that the heat generated from the irradiation of laser light is difficult to conduct into the environment. Thus, the heat can be concentrated into the irradiated portion. Accordingly, even if the aluminum or aluminum alloy of the bonding areas does not absorb the energy of laser light before it is molten, the heat generated by the laser light can be effectively used, thereby surely melting the aluminum or aluminum alloy. Further, this permits laser welding to be performed with reduced power. For this reason, the fear that pin-holes and cracks are generated in the bonding areas by excessive heating after being molten can be eliminated.

Preferably, the thickness of each of the bonding areas is 0.5 mm or larger in order to assure the strength of a battery case, and 1.2 mm or smaller in order to improve the melting in laser welding. Particularly, such limitation is effective for a battery having capacitance of 10 Ah or larger.

According to the second aspect, the present invention provides a battery provided with a battery case in which with a battery cover of aluminum or aluminum alloy fit into a battery case body of aluminum or aluminum alloy, their bonding areas are connected by laser welding. In the battery, the oxygen content of aluminum in the bonding areas of the battery case body and battery cover is 1000 ppm or lower.

When aluminum or aluminum alloy is left in the air, its surface is oxidized to form an oxide covering film. Such an oxide covering film has a high melting point. Therefore, if the temperature resulted from the irradiation of the laser light is too low, this oxide covering film hinders aluminum or aluminum alloy in the bonding areas from being molten. However, in accordance with the second aspect of the present invention, the oxygen content of the aluminum alloy of the bonding areas can be reduced to 1000 ppm or less so that the oxide having a high melting point can be removed substantially completely. Thus, the aluminum alloy of the bonding areas can be easily molten. Accordingly, even if the aluminum or aluminum alloy of the bonding areas does not absorb the energy of laser light before it is molten, the heat generated by the laser light can be effectively used, thereby surely melting the aluminum or aluminum alloy. Further, this permits laser welding to be performed with reduced power. For this reason, the fear that pin-holes and cracks are generated in the bonding areas by excessive heating after being molten can be eliminated.

According to the third aspect, the present invention provides a battery provided with a battery case in which with a battery cover of aluminum or aluminum alloy fit into a battery case body of aluminum or aluminum alloy, their bonding areas are connected by laser welding. In the battery, a cladding material of aluminum or aluminum alloy having a lower melting point than that of the case body is bonded to at least a bonding face of at least one of the battery case body and battery cover.

The battery case of aluminum or aluminum alloy is generally made of a material having a high melting point in order to assure its sufficient strength. However, aluminum or aluminum alloy having a lower melting point than that of the case body is located between the respective bonding areas of the battery case body and battery cover in order to assure their strength. Thus, such aluminum or aluminum alloy having a low melting point can be easily molten by irradiation of light. Accordingly, even if the aluminum or aluminum alloy of the bonding areas does not absorb the energy of laser light before it is molten, the aluminum or aluminum alloy having a lower melting point is molten precedently to enhance the abortion rate of laser light. This permits the aluminum or aluminum alloy having a higher melting point to be molten. Further, this permits laser welding to be performed with reduced power. For this reason, the fear that pin-holes and cracks are generated in the bonding areas by excessive heating after molten can be eliminated.

According to the fourth aspect, the present invention provides a method of manufacturing a battery provided with a battery case in which with a battery cover of aluminum or aluminum alloy fit into a battery case body of aluminum or aluminum alloy, their bonding areas are connected by laser welding. The method comprises the steps of: forming a notch at an outer edge of a bonding face of at least one of the battery case body and battery cover and constituting a groove due to the notch when the battery cover is fit into the battery case body; and irradiating the groove with laser light for laser welding.

In accordance with the fourth aspect, the groove between the bonding areas of the battery case body and battery case cover is irradiated with laser light. The absorption rate of the laser light can be increased, thereby surely melting the aluminum or aluminum alloy. Further, this permits laser welding to be performed with reduced power. For this reason, the fear that pin-holes and cracks are generated in the bonding areas by excessive heating after molten can be eliminated.

According to the fifth aspect, the present invention provides a method of manufacturing a battery provided with a battery case in which with a battery cover of aluminum or aluminum alloy fit into a battery case body of aluminum or aluminum alloy, their bonding areas are connected by laser welding. The method comprises the steps of: subjecting laser-light-irradiated surface at the bonding areas of the battery case body and the battery cover to surface processing so that the surface roughness ranges from 1 $\mu$m to 100 $\mu$m; and irradiating the bonding areas with laser light for laser welding when the battery cover is fit into the battery case body.

In accordance with the fifth aspect of the present invention, the laser-light-irradiated surface at the bonding areas of the battery case body and the battery cover is subjected to surface processing. Thus, the absorption rate of the laser light can be enhanced, thereby surely melting the aluminum or aluminum alloy. Further, this permits laser welding to be performed with reduced power. For this reason, the fear that pin-holes and cracks are generated in the bonding areas by excessive heating after molten can be eliminated.

PREFERRED EMBODIMENTS OF THE INVENTION

Figure 1:
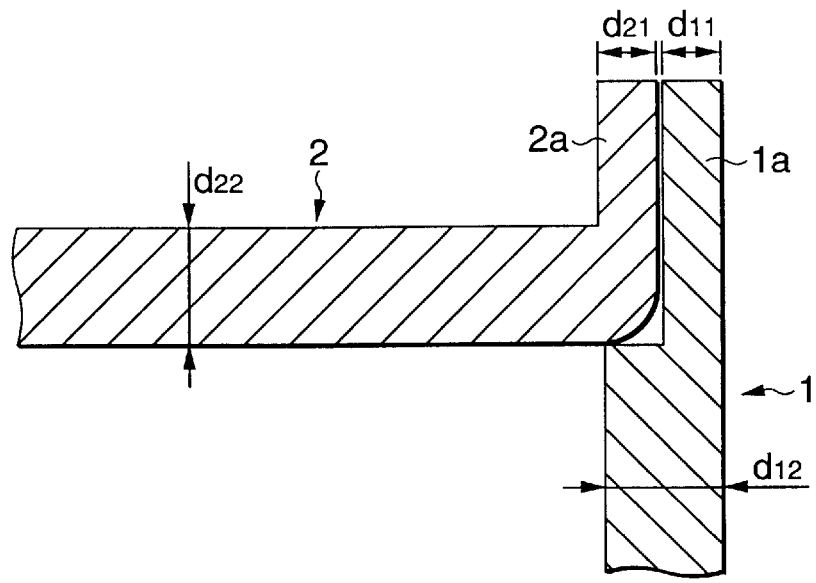
FIG. 1 shows a first embodiment of the present invention which is a partial enlarged longitudinal-sectional view showing an example of bonding areas of a battery case body and a battery cover.

Now referring to the drawings, an explanation will be given of embodiments of the present invention.

Figure 2:
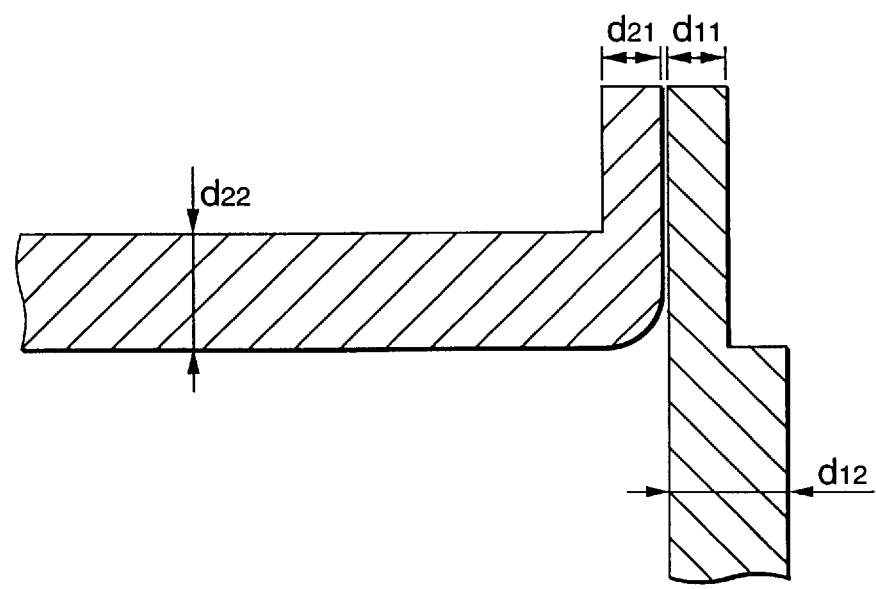
FIG. 2 shows the first embodiment of the present invention which is a partial enlarged longitudinal-sectional view showing another example of bonding areas of the battery case body and battery cover.

FIGS. 1 to 2 show a first embodiment of the present invention. Specifically, FIG. 1 is a partial enlarged longitudinal-sectional view showing an example of bonding areas of a battery case body and a battery cover. FIG. 2 is a partial enlarged longitudinal-sectional view showing another example of bonding areas of the battery case body and battery cover. In FIGS. 1 and 2, the same reference numerals refer to elements having the same functions in FIGS. 10 to 13.

Figure 10:
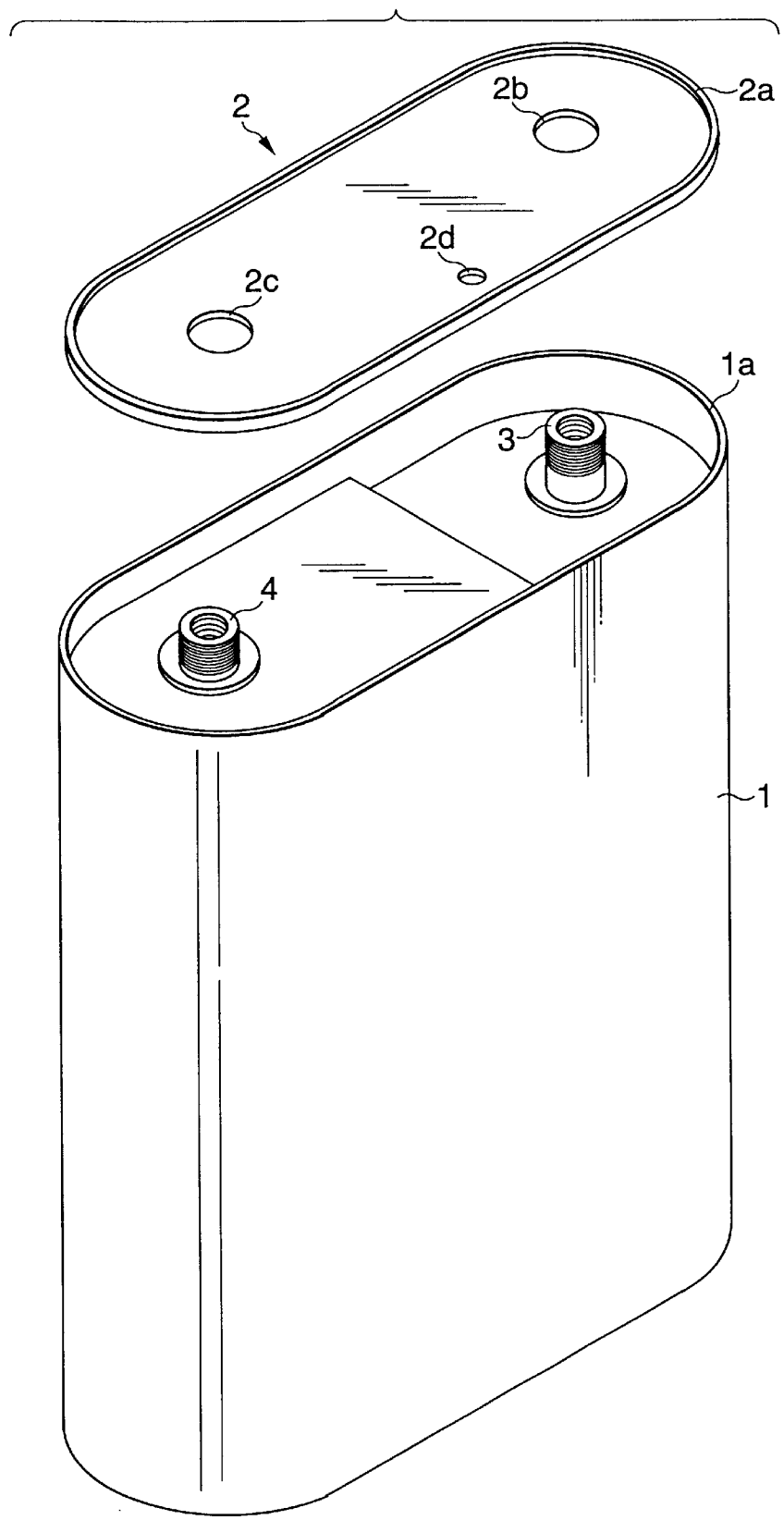
FIG. 10 is a perspective view of a non-aqueous electrolytic battery when a battery cover is fit into a battery case body.
Figure 11:
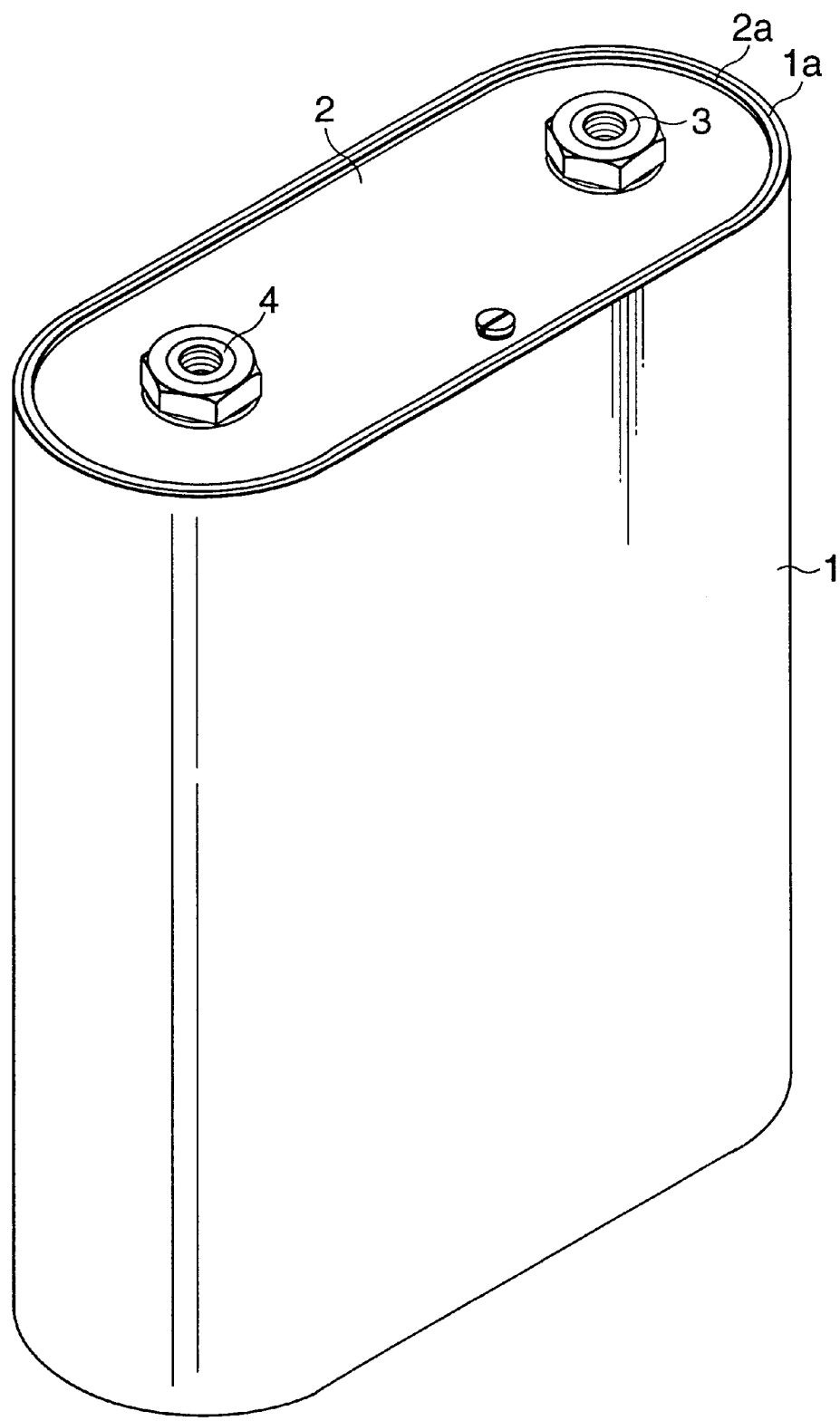
FIG. 11 is a perspective view showing the structure of a battery case of a non-aqueous electrolytic battery.
Figure 12:
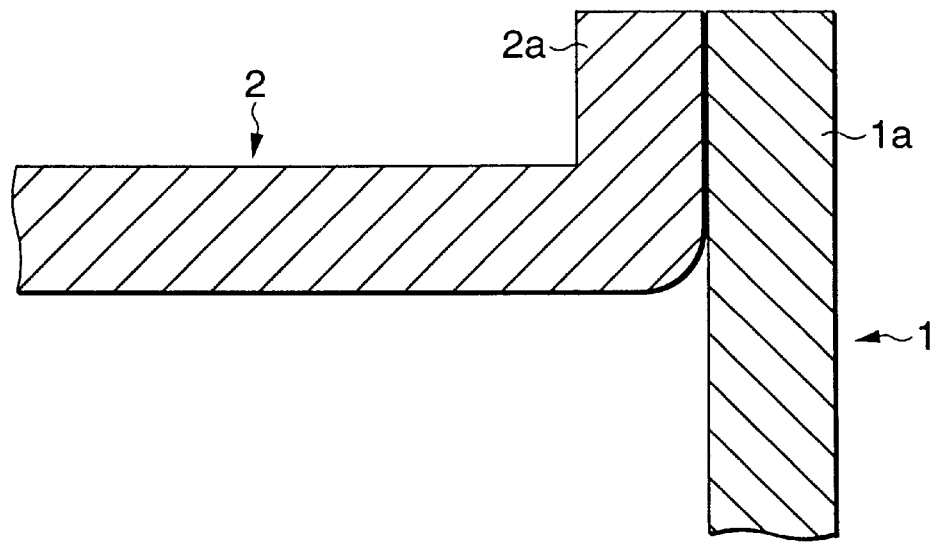
FIG. 12 shows a partial enlarged longitudinal-sectional view of bonding areas of a conventional battery case body and a battery cover.
Figure 13:
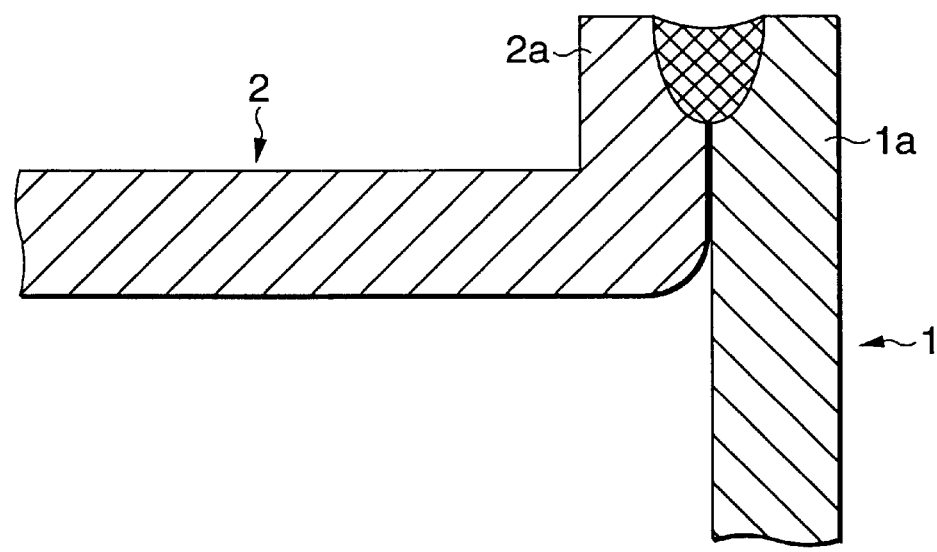
FIG. 13 is a partial enlarged longitudinal-sectional view of bonding areas of a conventional battery case body and a battery cover after they are laser-welded.

This embodiment will be explained in connection with the large-sized non-aqueous secondary battery as shown in FIGS. 10 to 11. In such a non-aqueous secondary battery, in an upper end opening of the battery case body 1 of aluminum alloy in a shape of a long cylindrical vessel 1, an oval battery cover 2 of the same aluminum alloy is fit in an upper end opening of the battery case body 1, and its periphery is sealed by laser welding. In the battery case body 1 in a shape of a long cylindrical vessel, as shown in FIG. 1, the inner face of the bonding area 1a in the upper end opening is recessed stepwise toward the outer periphery so that the thickness d11 of the bonding area 1a of the battery case body 1 is about ½ (preferably, ¼ to ¾) as large as the thickness d12 of the remaining portion thereof. The peripheral edge of the battery cover 2 in an oval disk shape is bent upwards to constitute a bonding area 2a having a thickness d21 that is about ½ (preferably, ¼ to ¾) as large as the thickness d22 of the remaining portion of the battery cover 2.

In the embodiment shown in FIGS. 1 and 2, the thicknesses d11, d21 are about ½ as large as the thicknesses d12, d22, respectively. In the present invention, the bonding portion is thinner than the remaining portions to have an effect of the invention. However, taking account of the mechanical strength of the case, easily performing laser welding, etc., the thicknesses d11, d21 are preferably ¼ to ¾ as large as the thickness d12, d22 of the remaining portions, respectively.

The battery cover 2 is fit in the upper end opening of the battery case body 1 so that the bonding area 2a bent upward is fit along the stepped portion inside of the bonding area 1a of the battery case body 1. The upper end surface of the respective bonding areas 1a and 2a of the battery case body 1 and battery cover 2 are irradiated with laser light so that the aluminum alloy of the portion thus irradiated is molten to implement the laser welding. In this case, if the respective thicknesses d11 and d21 of the bonding areas 1a and 2a are equal to those d12 and d22 of the remaining portions, the thermal conduction coefficient of the aluminum alloy is relatively high. Therefore, with low power of the laser light, the heat generated by the irradiation of the laser light is immediately conducted to the portions other than the bonding areas 1a and 2a and diffused there. As a result, the temperature of the irradiated portion is not sufficiently risen. On the other hand, in the case of this embodiment, since the thicknesses d11 and d21 of the bonding areas 1a and 2a are relatively thin, the heat generated by the irradiation of the laser light cannot be easily conducted to the portions other than the bonding areas 1a and 2a. As a result, heat is concentrated so that the temperature of the portion irradiated can be sufficiently risen.

Accordingly, even if the power of the laser light is reduced, the heat generated by the irradiation of the laser light can be effectively used so that the aluminum alloy of the bonding areas 1a and 2a is surely molten. Thus, after being molten, even if the absorption rate of the laser light in the aluminum alloy is abruptly raised, the fear that pin-holes and cracks are generated in the bonding areas by excessive heating can be prevented.

In this embodiment, the inner face of the bonding area 1a of the battery case body 1 is recessed stepwise toward the outer periphery. Otherwise, as shown in FIG. 2, the outer surface of the bonding area 1a may be recessed stepwise towards the inner periphery. Further, the battery cover 2 may be fit in the battery case body 1 so that its bonding area 2a is bent downward to cover the bonding area 1a of the upper end opening of the battery case body 1.

Figure 3:
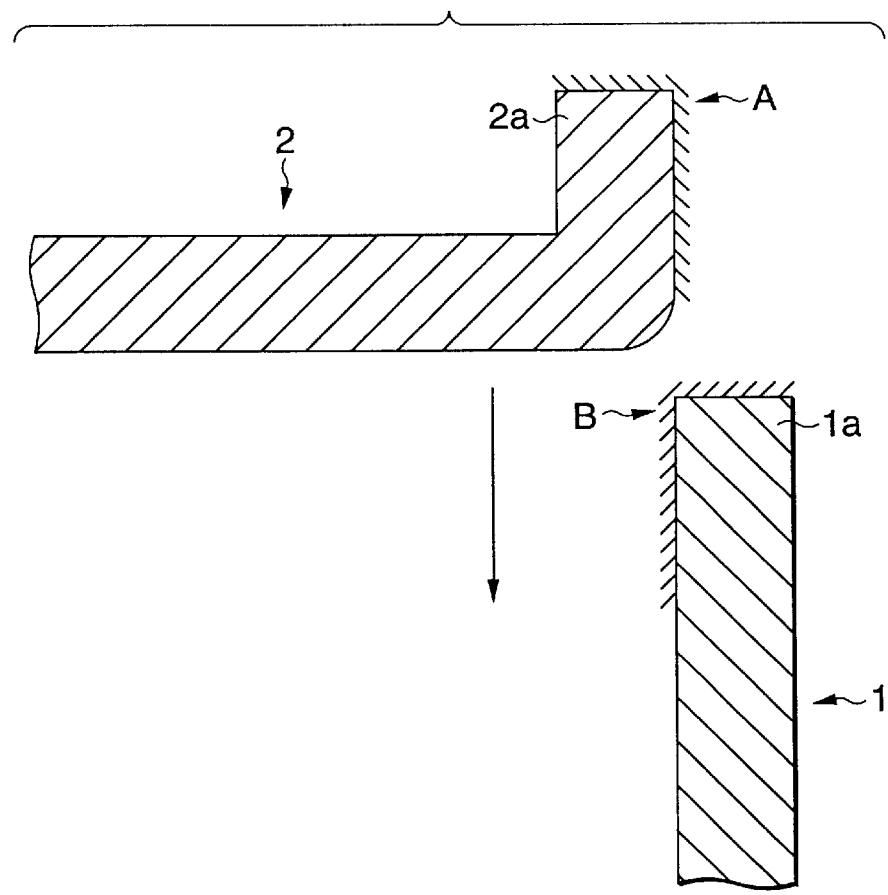
FIG. 3 shows the second embodiment of the present invention which is a partial enlarged longitudinal-sectional view showing the state before fitting of bonding areas of a battery case body and a battery cover.
Figure 4:
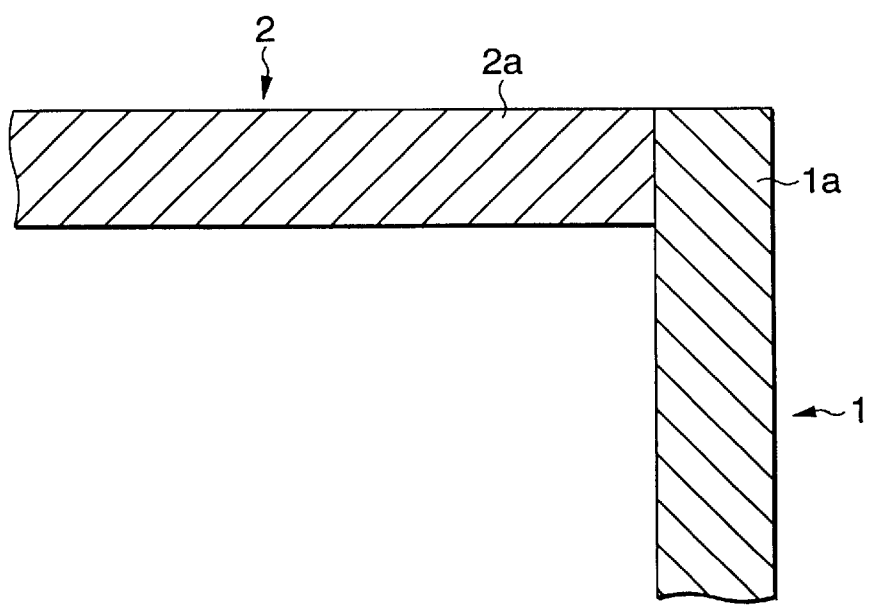
FIG. 4 shows the second embodiment of the present invention which is a partial enlarged longitudinal-sectional view showing another example of bonding areas of the battery case body and battery cover.

FIGS. 3 to 4 show a second embodiment of the present invention. Specifically, FIG. 3 is a partial enlarged longitudinal-sectional view showing the state before fitting of bonding areas of a battery case body and a battery cover. FIG. 4 is a partial enlarged longitudinal-sectional view showing another example of bonding areas of the battery case body and battery cover. In FIGS. 3 and 4, the reference numerals refer to elements having the same functions in the first embodiment shown in FIGS. 1 and 2.

This embodiment will be also explained in connection with the large-sized non-aqueous secondary battery as shown in FIGS. 10 to 11. In such a non-aqueous secondary battery, as shown in FIG. 3, a battery case body 1 in a shape of a long cylindrical vessel and an oval disk-shaped battery cover 2. However, the oxide covering film of the bonding area 1a formed in the upper end opening of the battery case body 1 is removed by cutting or grinding on its inner peripheral surface and upper end surface, at least shaded by "B". The oxide covering film of the bonding area 2a formed by upward bending the peripheral edge of the battery over 2 is removed by cutting or grinding on its outer peripheral surface and upper end surface, at least shaded by "A". The battery cover 2 is fit into the upper end opening of the battery case body 1 so that the bonding area 2a of the battery cover 2 is fit along the inside of the bonding area 1a of the battery case body 1. The upper end surfaces of the respective bonding areas 1a and 2a of the battery case body 1 and battery cover 2 are irradiated with laser light. Thus, the aluminum alloy of the irradiated area is molten for laser welding. This laser welding is preferably carried out in an environment atmosphere of inner gas such as nitrogen gas.

The aluminum alloy of the battery case body 1 and battery cover 2 is generally touched with an oxygen gas in the air during the processing in a manufacturing line so that its surface is oxidized to form an oxide covering film. Such an oxide covering film has a high melting point. Therefore, if the temperature resulted from the irradiation of the laser light is too low, this oxide covering film hinders aluminum or aluminum alloy of the bonding areas from being molten. In this embodiment, since the oxide covering films of the battery case body 1 and battery cover 2 are removed in their bonding areas 1a and 2a, the oxygen content of the aluminum alloy can be reduced to 1000 ppm or less to eliminate the oxide having a high melting point. Thus, the aluminum alloy of the bonding areas 1a and 2a can be easily molten. Accordingly, even if the power of the laser light is lowered, the heat generated by the laser light can melt the aluminum alloy of the bonding areas 1a and 2a. As a result, even if the absorption rate of the laser light of the aluminum alloy is increased, the fear that pin-holes or cracks may be generated in the bonding areas because of excessive heating can be eliminated.

In this embodiment, although the oxide covering films of the bonding areas 1a and 2a were removed by cutting or grinding, they may be removed by chemical treatment. Otherwise, the aluminum alloy of the battery case body 1 and battery cover 2 having no oxide covering film may be used. In this case, the battery case must be manufactured so that the aluminum alloy of the battery case body 1 and battery cover are not touched with oxygen and no oxide covering film is formed during the manufacturing process. Further, in this embodiment, although the bonding area 2a formed by upward bending the peripheral edge of the battery cover 2 was fit along the bonding area 1a of the battery case body 1, the bonding areas 1a and 2a may have any optional shape. For example, as shown in FIG. 4, the peripheral side end of the oval disk-shaped battery cover 2 may be used as a bonding area 2a which is fit along the inside of the bonding area 1a of the upper end opening of the battery case body 1.

Figure 5:
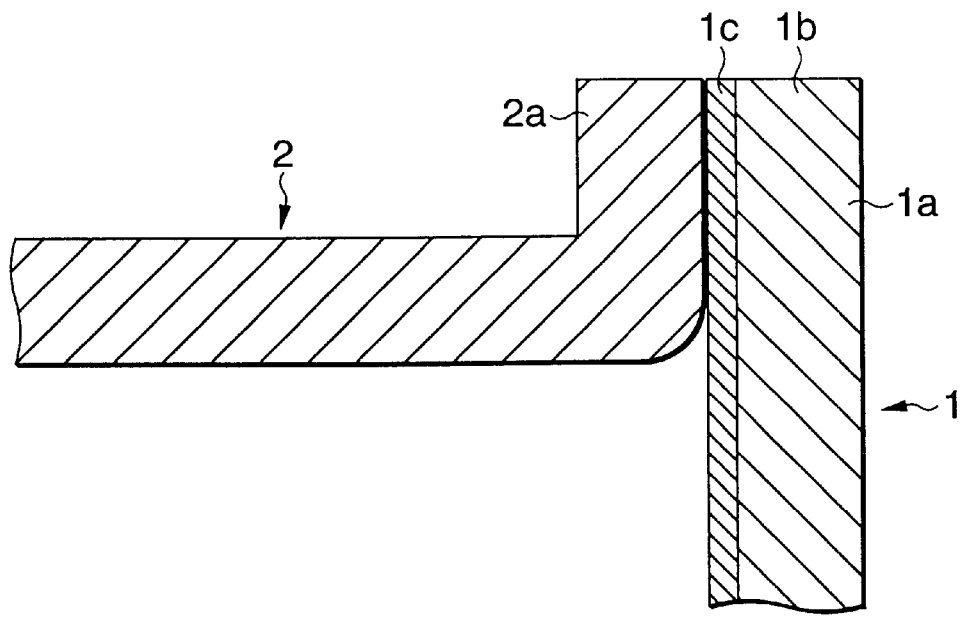
FIG. 5 shows a third embodiment of the present invention which is a partial enlarged longitudinal-sectional view showing an example of bonding areas of a battery case body and a battery cover.
Figure 6:
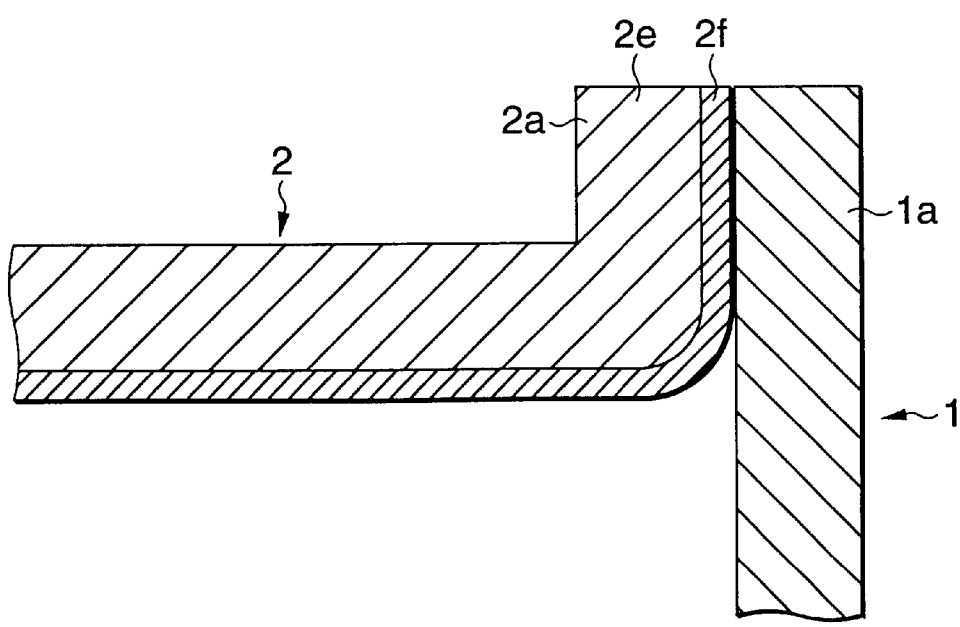
FIG. 6 shows the third embodiment of the present invention which is a partial enlarged longitudinal-sectional view showing another example of bonding areas of the battery case body and battery cover.
Figure 7:
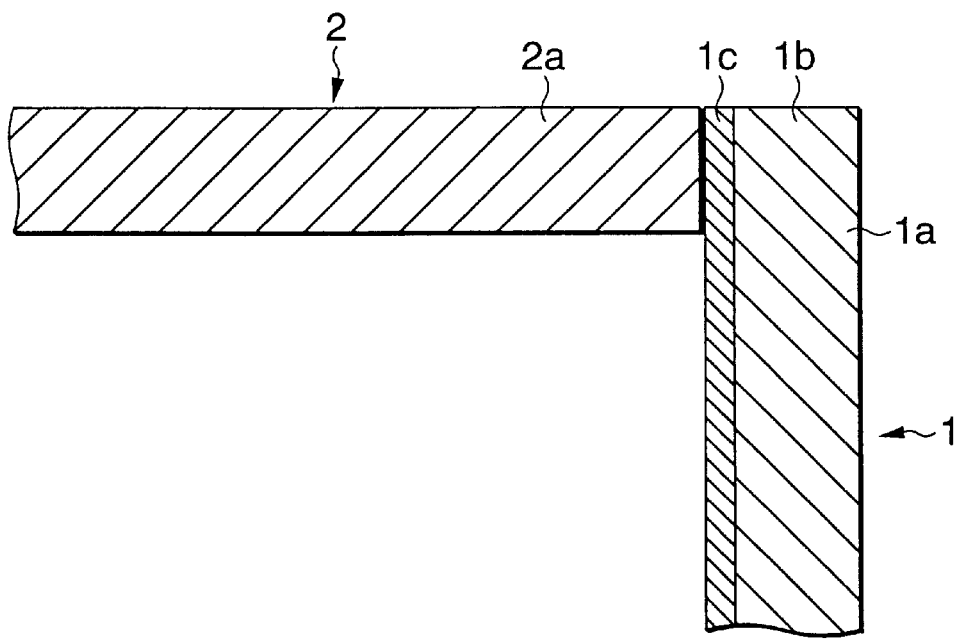
FIG. 7 shows the third embodiment of the present invention which is a partial enlarged longitudinal-sectional view showing still another example of bonding areas of a battery case body and a battery cover.

FIGS. 5 to 7 show a third embodiment of the present invention. Specifically, FIG. 5 is a partial enlarged longitudinal-sectional view showing the bonding areas of a battery case body and a battery cover. FIG. 6 is a partial enlarged longitudinal-sectional view showing another example of bonding areas of the battery case body and battery cover. FIG. 7 is a partial enlarged longitudinal-sectional view showing still another example of bonding areas of the battery case body and battery cover. In FIGS. 5 to 7, the same reference numerals refer to elements having the same functions in the first embodiment shown in FIGS. 1 and 2.

This embodiment will be also explained in connection with the large-sized non-aqueous secondary battery as shown in FIGS. 10 to 11. In such a non-aqueous secondary battery, as shown in FIG. 5, a battery case body 1 in a shape of a long cylindrical vessel. However, the battery case body 1 is formed of a cladding material in which a substantially pure aluminum plate 1c is bonded to the inner face of an aluminum alloy plate according to JIS standard 3003 with high strength and excellent processing/corrosion-resistance property. The oval disk-shaped battery cover 2 is formed of only the aluminum alloy according to JIS standard 3003. The aluminum alloy according to JIS standard 3003 contains aluminum, 0.05 to 0.20 wt % of Cu, 0.6 wt % or less of Si, 0.7 wt % or less of Fe, 1.0 to 1.5 wt % of Mn, 0.10 wt % or less of Zn and 0.15 wt % of others.

The battery cover 2 is fit in the upper end opening of the battery case body 1 so that the bonding area 2a is fit along the inner pure aluminum plate 1c of the bonding area 1a of the battery case body 1. The upper end surfaces of the respective bonding areas 1a and 2a of the battery case body 1 and battery cover 2 are irradiated with laser light. Thus, the aluminum alloy of the irradiated area is molten for laser welding. During the laser welding, the pure aluminum plate 1c having a lower melting point than the aluminum alloy plate 1b is first molten so that the absorption rate of the laser light of the molten area is increased. Further, the outer aluminum alloy plate 1b and aluminum alloy of the battery cover 2 are molten. In this way, with reduced power of the laser light, the aluminum alloy of the bonding areas 1a and 2a can be surely molten in such a manner that the pure aluminum plate 1c having a low melting point is precedently molten. This makes the increase in the absorption rate of the laser light stepwise. In addition, the power of the laser is low. For this reason, the fear that pin-holes or cracks may be generated in the bonding areas because of excessive heating can be eliminated.

In this embodiment, although the battery case body 1 was formed of the cladding material, as shown in FIG. 6, the battery cover 2 may be formed of a cladding material in which an aluminum plate 2f is bonded to the rear surface of the aluminum alloy plate 2e. Further, both battery case body 1 and battery cover 2 may be formed of the cladding material. Furthermore, in this embodiment, the bonding area 2a bent upwards of the battery cover 2 is fit along the bonding area 1a of the battery case body 1, the bonding areas 1a and 2a may have any optional shape. For example, as shown in FIG. 7, the peripheral side end of the oval disk-shaped battery cover 2 may be used as a bonding area 2a which is fit along the inside of the bonding area 1a of the upper end opening of the battery case body 1. In the case of FIG. 7, it should be noted that the battery case body 1 is formed of the cladding material.

In this embodiment, the cladding material was composed of an aluminum alloy plate having a high melting point and a pure aluminum plate having a low melting point. However, it may be composed of aluminum alloy plates having different melting points, otherwise may be composed of a pure aluminum plate and an aluminum alloy having a lower melting point than that of this pure aluminum plate.

Figure 8:
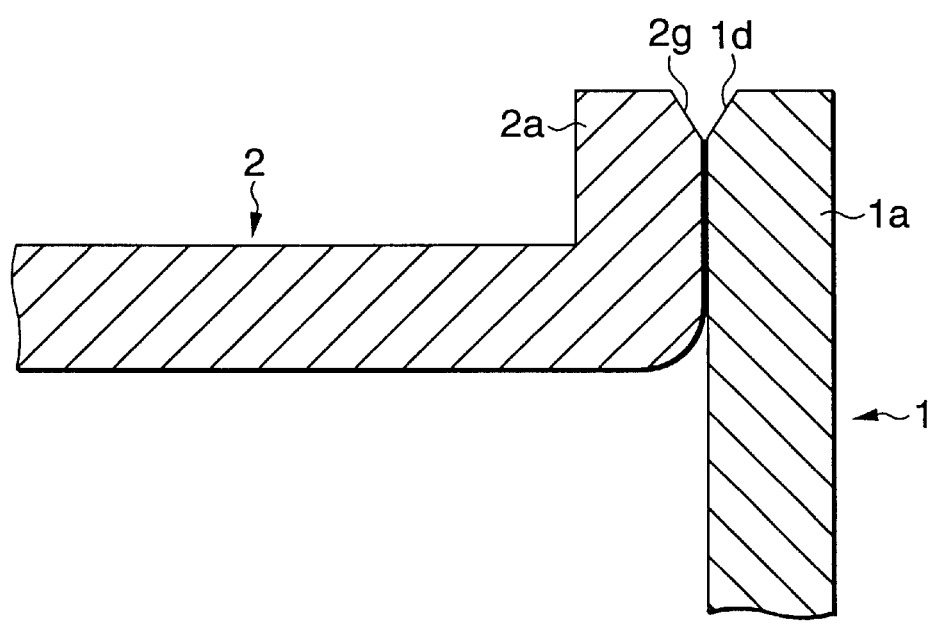
FIG. 8 shows a fourth embodiment of the present invention which is a partial enlarged longitudinal-sectional view showing bonding areas of the battery case body and battery cover.

FIG. 8 shows a fourth embodiment of the present invention. Specifically, FIG. 8 is a partial enlarged longitudinal-sectional view showing the bonding areas of a battery case body and a battery case body 1. In FIG. 8, the same reference numerals refer to elements having the same functions in the first embodiment shown in FIGS. 1 and 2.

This embodiment will be also explained in connection with the large-sized non-aqueous secondary battery as shown in FIGS. 10 to 11. In such a non-aqueous secondary battery, as shown in FIG. 8, a battery case body 1 in a shape of a long cylindrical vessel. In this structure, a notch 1d is formed at the upper end edge (outer edge) on an inner periphery of the bonding area 1a. A disk-shaped battery cover 2 has the same structure as that of the conventional art. In this structure, a notch 2g is formed at the upper end edge on an outer periphery of the bonding area 2a. The battery cover 2 is fit in the upper end opening of the battery case body 1 so that the bonding area 2a is fit along the inside of the bonding area 1a. A V-groove is formed by the notches 1d and 2g. The V-groove is irradiated with laser light for laser welding. The laser light enters the V-groove so that it is effectively absorbed. Thus, the aluminum alloy is continuously molten from the vicinity of the V-groove. Therefore, after the laser welding, the V-groove is deformed into a concave shape.

In this way, with reduced power of the laser light, the aluminum alloy can be molten from the vicinity of the V-groove so that the aluminum alloy of the bonding areas 1a and 2a can be surely molten. This makes the gradual increase in the absorption rate of the laser light. In addition, the power of the laser is low. For this reason, the fear that pin-holes or cracks may be generated in the bonding areas because of excessive heating can be eliminated.

In this embodiment, although notches 1d and 2g were formed in both the bonding areas 1a and 2a of the battery case body 1 and battery cover 2, a notch may be formed in either one of the bonding areas 1a and 2a. The shape of the notches 1d and 2g should not be limited to a linear shape. The shape of the groove thus formed should not be limited to a V-groove, but may be a U-groove or other grooves.

In this embodiment, although the bonding area 2a bent upwards of the battery cover 2 is fit along the bonding area 1a of the battery case body 1, the bonding areas 1a and 2a may have any optional shape.

Figure 9:
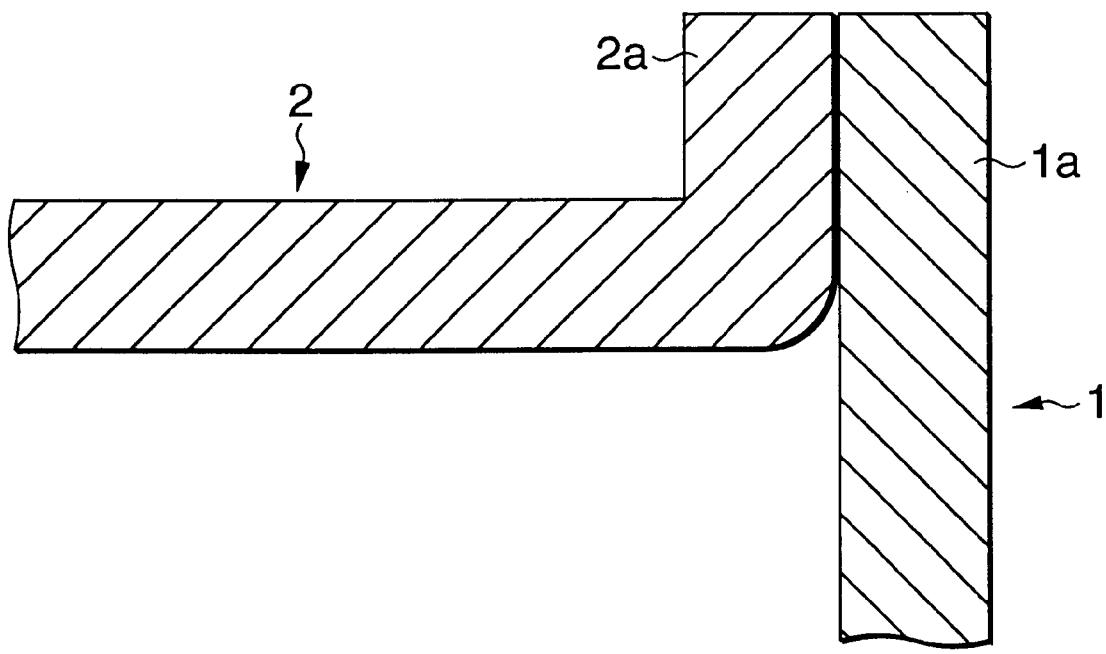
FIG. 9 shows a fifth embodiment of the present invention which is a partial enlarged longitudinal-sectional view showing an example of bonding areas of a battery case body and a battery cover.

FIG. 9 shows a fifth embodiment of the present invention. Specifically, FIG. 9 is a partial enlarged longitudinal-sectional view showing the bonding areas of a battery case body 1 and a battery cover. In FIG. 9, the same reference numerals refer to elements having the same functions in the first embodiment shown in FIGS. 1 and 2.

This embodiment will be also explained in connection with the large-sized non-aqueous secondary battery as shown in FIGS. 10 to 11. In such a non-aqueous secondary battery, as shown in FIG. 9, a battery case body 1 in a shape of a long cylindrical vessel and a disk-shaped battery cover 2 have the same structure as that of the conventional art. Further, as seen from FIG. 9, the upper end surfaces (laser irradiation surfaces) of the bonding areas 1a and 2a are cut and surface-processed using sandblast, wire brush or scrubbing brush with abrasive so that the surface roughness ranges from 1 $\mu$m to 100 $\mu$m. The battery cover 2 is fit in the upper end opening of the battery case body 1 so that the bonding area 2a is fit along the inside of the bonding areas 1a and 2a. The upper surfaces of the bonding areas 1a and 2a of the battery case body 1 and battery cover 2 are irradiated with laser light for laser welding. The laser light is effectively absorbed by the coarse end surfaces. Thus, the aluminum alloy of the bonding areas 1a and 2a can be easily molten.

In this way, with reduced power of the laser light, the aluminum alloy of the bonding areas 1a and 2a can be surely molten. For this reason, it is possible to prevent pin-holes or cracks from being generated in the bonding areas because of excessive heating due to an abrupt increase in the absorption rate in the laser light of the aluminum alloy after molten.

In this embodiment, although the surface was processed by mechanical machining such as sandblast, wire brush, etc., it may be processed chemically to form a coarse surface. Further, in this embodiment, although the bonding area 1a bent upwards of the battery cover 2 is fit along the bonding area 1a of the battery case body 1, the bonding areas 1a and 2a may have any optional shape.

In the first, second, fourth and fifth embodiments, although the battery case body 1 and battery cover 2 were made of an aluminum alloy, they may be made of pure aluminum.

Although the embodiments described above were directed to the large-cylindrical large-scale non-aqueous secondary battery, in accordance with the present invention, a kind or shape of the battery should not be limited.

As understood from the description hitherto made, in accordance with the battery and its manufacturing method in the present invention, with reduced power of laser light, the battery case can be easily laser-welded. This eliminates the fear that pin-holes or cracks may be generated at the bonding areas by excessive heating after melting.

What is claimed is:

1. A battery comprising:
  a battery case body consisting of aluminum or aluminum alloy; and
  a battery cover consisting of aluminum or aluminum alloy fitted into said battery case body, said battery case body and said battery cover having bonding areas, respectively, which are connected by laser welding;
  wherein said bonding area of the battery cover comprises a bent peripheral edge of said battery cover,
  wherein said bonding areas of the battery case body and battery cover are mated with each other and a thickness of said bonding areas is smaller than thicknesses of the remaining areas of the battery case body and battery cover, and
  wherein a capacity of the battery is 10 Ah or larger.

2. The battery according to claim 1, wherein the thickness of each of said bonding areas is in the range of 0.5 mm to 1.2 mm.

3. A battery comprising:
  a battery case body comprising aluminum or aluminum alloy; and
  a battery cover comprising aluminum or aluminum alloy fitted into said battery case body, said battery case body and said battery cover having bonding areas, respectively, which are connected by laser welding;
  wherein an oxide covering film of said bonding area of said battery case body or said battery cover is removed before said laser welding; and
  wherein a capacity of the battery is 10 Ah or larger.

4. A battery comprising:
  a battery case body comprising aluminum alloy; and
  a battery cover comprising aluminum alloy fitted into said battery case body, said battery case body and said battery cover having bonding areas, respectively, which are connected by laser welding;
  wherein a cladding material consisting of aluminum is bonded to at least a bonding face of at least one of said battery case body and battery cover,
  wherein a capacity of the battery is 10 Ah or larger.

5. A method of manufacturing a battery that has a capacity of 10 Ah or larger, comprising the steps of:
  forming a notch at an outer edge of a bonding face of at least one of a battery case body and battery cover, wherein said battery case body and said battery cover comprise aluminum or aluminum alloy;
  fitting said battery cover into said battery case body so that the notch defines a groove; and
  irradiating the groove with laser light for laser welding said bonding areas of said battery case body and battery cover.

6. The method according to claim 5, wherein said laser welding is performed under an atmosphere of an inert gas.

7. A method of manufacturing a battery that has a capacity of 10 Ah or larger, comprising the steps of:
  subjecting bonding areas of a battery case body and a battery cover, wherein said battery case body and said battery cover comprise aluminum or aluminum alloy, to surface processing so that the surface roughness ranges from 1 $\mu$m to 100 $\mu$m;
  fitting said battery cover into said battery case body; and
  irradiating the bonding areas with laser light for laser welding said bonding areas of said battery case body and battery cover.

8. The method according to claim 7, wherein said laser welding is performed under an atmosphere of an inert gas.

9. The battery according to claim 3, wherein an oxygen content of the aluminum or aluminum alloy in the bonding areas of the battery case body and battery cover is 1000 ppm or lower, before said laser welding.

* * * * *